US012551919B2

(12) United States Patent
Zhai et al.

(10) Patent No.: US 12,551,919 B2
(45) Date of Patent: Feb. 17, 2026

(54) COATING DIE, COATING APPARATUS, AND BATTERY PRODUCTION APPARATUS

(71) Applicant: CONTEMPORARY AMPEREX TECHNOLOGY (HONG KONG) LIMITED, Hong Kong (CN)

(72) Inventors: Pingsheng Zhai, Ningde (CN); Yuqing Liu, Ningde (CN); Shuibo Duan, Ningde (CN); Fuqian Deng, Ningde (CN); Nianwang Xie, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 461 days.

(21) Appl. No.: 18/347,550

(22) Filed: Jul. 5, 2023

(65) Prior Publication Data

US 2024/0253077 A1 Aug. 1, 2024

Related U.S. Application Data

(63) Continuation of application No. PCT/CN2023/084040, filed on Mar. 27, 2023.

(30) Foreign Application Priority Data

Jan. 28, 2023 (CN) ........................ 202320082971.X

(51) Int. Cl.
*B05C 5/02* (2006.01)

(52) U.S. Cl.
CPC .................................. *B05C 5/0254* (2013.01)

(58) Field of Classification Search
None
See application file for complete search history.

(56) References Cited

U.S. PATENT DOCUMENTS 5,650,011 A * 7/1997 Yoshinaga ................ B05C 9/04 118/316
5,851,289 A * 12/1998 Sato ....................... G11B 5/848 118/411

(Continued)

FOREIGN PATENT DOCUMENTS

CN 108889549 A 11/2018
CN 112916327 A 6/2021

(Continued)

OTHER PUBLICATIONS

State Intellectual Property Office of China Notice of Grant of Invention Patent Right for Application No. 202320082971.X Feb. 21, 2023 2 pages (including translation).

(Continued)

*Primary Examiner* — Jethro M. Pence
(74) *Attorney, Agent, or Firm* — ANOVA LAW GROUP, PLLC

(57) ABSTRACT

A coating die includes a die body and a regulation assembly. An accommodating cavity for accommodating a slurry is provided in the die body, and the die body is further provided with a coating gap communicating with the accommodating cavity and extending along a first direction. The regulation assembly includes a flow regulation member running through the die body along a second direction and capable of running into the coating gap. The regulation assembly further includes a drive mechanism, where the drive mechanism is connected to an end of the flow regulation member extending out of the die body so as to drive the flow regulation member to move along the second direction, and the drive mechanism is configured to be able to regulate displacement of the flow regulation member in the second direction according to coating weight information of a slurry flowing out of the coating gap.

15 Claims, 8 Drawing Sheets

(56) References Cited

U.S. PATENT DOCUMENTS

| | | | | |
|---|---|---|---|---|
| 7,625,449 | B2 * | 12/2009 | Pekurovsky | B05C 5/0254 118/DIG. 2 |
| 10,888,893 | B2 * | 1/2021 | Stensvad | B05C 5/0266 |
| 11,413,648 | B2 * | 8/2022 | Kim | B05C 5/0254 |
| 11,642,692 | B2 * | 5/2023 | Horinouchi | H01M 10/058 29/623.5 |
| 11,850,627 | B2 * | 12/2023 | Horinouchi | B05C 5/027 |
| 11,964,298 | B2 * | 4/2024 | Seol | H01M 4/0404 |
| 11,975,355 | B2 * | 5/2024 | Che | B05C 5/0254 |
| 12,134,107 | B2 * | 11/2024 | Lee | B05C 5/0254 |
| 12,214,376 | B2 * | 2/2025 | Park | B05C 5/0262 |
| 12,280,394 | B2 * | 4/2025 | Horinouchi | B05D 1/34 |
| 12,420,303 | B2 * | 9/2025 | Lee | H01M 4/0404 |
| 12,427,540 | B2 * | 9/2025 | Pu | B05C 5/0258 |
| 12,434,259 | B2 * | 10/2025 | Liu | B05C 5/0258 |
| 2004/0228972 | A1 * | 11/2004 | Pekurovsky | B05C 5/0254 118/200 |
| 2006/0257574 | A1 * | 11/2006 | Pekurovksy | B05C 5/0254 118/410 |
| 2013/0260046 | A1 * | 10/2013 | Komatsubara | B05C 11/1013 118/712 |
| 2022/0158158 | A1 | 5/2022 | Kang et al. | |
| 2023/0061304 | A1 * | 3/2023 | Sato | B05C 5/0254 |
| 2023/0249216 | A1 * | 8/2023 | Lee | B05C 5/0254 118/125 |
| 2024/0162407 | A1 * | 5/2024 | Kim | B05C 5/0254 |
| 2024/0253077 | A1 * | 8/2024 | Zhai | B05C 5/0262 |
| 2024/0293837 | A1 * | 9/2024 | Lee | H01M 4/366 |
| 2024/0390932 | A1 * | 11/2024 | Lin | B05C 5/0266 |
| 2025/0010327 | A1 * | 1/2025 | Wang | B05D 1/26 |
| 2025/0242377 | A1 * | 7/2025 | Liu | B05C 5/0254 |

FOREIGN PATENT DOCUMENTS

| | | | |
|---|---|---|---|
| CN | 113926645 | A | 1/2022 |
| CN | 114728304 | A | 7/2022 |
| JP | 2013066853 | A | 4/2013 |
| KR | 20080064091 | A | 7/2008 |
| KR | 101861556 | B1 | 5/2018 |
| WO | 2020122162 | A1 | 6/2020 |

OTHER PUBLICATIONS

The World Intellectual Property Organization (WIPO) International Search Report and Written Opinion for PCT/CN2023/084040 Oct. 24, 2023 14 Pages (including translation).

The European Patent Office (EPO) The Extended European Search Report for Application No. 23733832.2 Oct. 21, 2024 10 Pages.

* cited by examiner

COATING DIE, COATING APPARATUS, AND BATTERY PRODUCTION APPARATUS

CROSS-REFERENCE TO RELATED APPLICATIONS

This application is a continuation of International Application No. PCT/CN2023/084040, filed on Mar. 27, 2023, which claims priority to Chinese Patent Application No. 202320082971.X, filed on Jan. 28, 2023 and entitled "COATING DIE, COATING APPARATUS, AND BATTERY PRODUCTION APPARATUS", which are incorporated herein by reference in their entirety.

TECHNICAL FIELD

This application relates to the field of coating technology, in particular, to a coating die, a coating apparatus, and a battery production apparatus.

BACKGROUND

In the related art, an electrode plate of a battery includes a current collector and an active substance layer applied on the current collector. A coating apparatus is typically employed to coat the electrode plate to form the active substance layer on the electrode plate.

However, the flow of slurry extruded by a coating die of a conventional coating apparatus is prone to fluctuations.

SUMMARY

In view of this, there is a need to provide a coating die, a coating apparatus, and a battery production apparatus to solve the problem that the flow of slurry extruded by a coating die of a conventional coating apparatus is prone to fluctuations.

According to a first aspect of this application, a coating die is provided, including a die body and at least one regulation assembly. An accommodating cavity for accommodating a slurry is provided in the die body, and the die body is further provided with a coating gap communicating with the accommodating cavity and extending along a first direction. Each regulation assembly includes a flow regulation member running through the die body along a second direction and capable of running into the coating gap, the flow regulation member being configured to move along the second direction relative to the die body. Each regulation assembly further includes a drive mechanism, the drive mechanism being connected to an end of the flow regulation member extending out of the die body so as to drive the flow regulation member to move along the second direction. The drive mechanism is configured to be able to regulate displacement of the flow regulation member in the second direction according to coating weight information of a slurry flowing out of the coating gap. The first direction and the second direction intersect with each other.

In the technical solutions of this application, the drive mechanism is configured to drive the flow regulation member to move along the second direction, so that an opening degree of the coating gap can be regulated and the flow of the slurry flowing out of the coating gap can be regulated as well. With the first direction and the second direction intersecting with each other, when the flow regulation member moves along the second direction, that is, the flow regulation member moves along a direction intersecting with a longitudinal extension direction of the coating gap, the flow regulation member can extend into the coating gap. In this way, a size of the coating gap in the second direction can be regulated, that is, the opening degree of the coating gap can be regulated. Thus, the flow of the slurry flowing out of the coating gap can be regulated and the flow regulation member after regulation is not affected by the environment, so that the slurry can flow out of the coating gap stably. In addition, the coating weight information can be analyzed and compared with a preset value, and height of one flow regulation member in the second direction can be adjusted based on a difference between the coating weight information and the preset value, which helps a coating finally applied satisfy the requirements, thereby achieving closed-loop control.

In an embodiment, each regulation assembly further includes a transmission member, and the drive mechanism is connected to the end of the flow regulation member extending out of the die body via the transmission member so as to drive, via the transmission member, the flow regulation member to move a preset distance along the second direction per unit time. That the drive mechanism drives, via the transmission member, the flow regulation member to move the preset distance along the second direction per unit time can more accurately regulate the opening degree of the coating gap, thereby more accurately regulating the flow of the slurry flowing out of the coating gap.

In an embodiment, the transmission member moves along the first direction under a driving force of the drive mechanism and drives the flow regulation member to move along the second direction. In a same time period, the transmission member has a displacement of A in the first direction, and the flow regulation member has a displacement of B in the second direction, where A>B. In the process of the drive mechanism driving, via the transmission member, the flow regulation member to move along the second direction, with A>B, it can be understood that compared with the displacement of the transmission member in the first direction, the displacement of the flow regulation member in the second direction is smaller. This is conducive to improvement of the displacement accuracy of the flow regulation member, thereby more accurately regulating the flow of the slurry flowing out of the coating gap.

In an embodiment, the transmission member has a first inclined surface at an angle to both the first direction and the second direction, and the flow regulation member has a second inclined surface parallel to the first inclined surface, where the first inclined surface fits with the second inclined surface to convert linear motion of the transmission member in the first direction into linear motion of the flow regulation member in the second direction. As the first inclined surface is disposed at an angle to both the first direction and the second direction, it can be understood that when the drive mechanism drives the transmission member to move along the first direction, the transmission member can be well assisted by the first inclined surface and the second inclined surface to enable the flow regulation member to move along the second direction.

In an embodiment, the transmission member includes a first portion connected to the corresponding drive mechanism and extending along the first direction and a second portion connected to a side of the first portion away from the corresponding drive mechanism. The first inclined surface is provided on the second portion. During operation, the drive mechanism can drive the transmission member to move along the first direction and convert the linear motion of the transmission member in the first direction into the linear motion of the flow regulation member in the second direction under cooperation between the first inclined surface and the second inclined surface of the second portion.

In an embodiment, the flow regulation member has a through groove for the second portion to run through, and the second inclined surface is provided on a side wall of the through groove. The second portion running through the through groove facilitates a more stable conversion of the linear motion of the transmission member in the first direction into the linear motion of the flow regulation member in the second direction. This can improve the transmission effect of the transmission member.

In an embodiment, two opposite sides of the second portion in the second direction are each provided with the first inclined surface, and the side wall of the through groove of the flow regulation member is provided with two second inclined surfaces in one-to-one correspondence with the first inclined surfaces. Under cooperation between the first inclined surface and the corresponding second inclined surface, the drive mechanism converts the linear motion of the transmission member in the first direction into the linear motion of the flow regulation member in the second direction. The two opposite sides of the second portion in the second direction are each provided with the first inclined surface, allowing a better transmission effect of the transmission member.

In an embodiment, the coating die further includes a guide member, and the first portion is slidably connected to the guide member in the first direction. During operation of the drive mechanism, the first portion can move directionally along the first direction relative to the guide member, which facilitates improvement of reliability of the coating die.

In an embodiment, the guide member has a first sliding groove and a second sliding groove spaced apart in the first direction and communicating with each other, the transmission member further includes a third portion connected to a side of the second portion away from the first portion, the first portion is slidably connected to the first sliding groove in the first direction, and the third portion is slidably connected to the second sliding groove in the first direction. In this way, during operation, the drive mechanism can more stably drive the transmission member to move directionally along the first direction, which helps better drive the flow regulation member to move along the second direction.

In an embodiment, a first rolling member is disposed on a side wall of at least one of the first sliding groove and the second sliding groove, the first rolling member being configured to be able to rotate under driving of the transmission member moving along the first direction. Use of the first rolling member reduces contact areas between the transmission member and the side wall of the first sliding groove, between the transmission member and the side wall of the first sliding groove and the side wall of the second sliding groove, or between the transmission member and the side wall of the second sliding groove, so that a smaller friction coefficient is present between the guide member and the transmission member. This can allow the transmission member to move along the first direction more stably and more smoothly, thus facilitating improvement of sensitivity and accuracy of the coating die.

In an embodiment, the guide member includes a first pressing plate assembly and a second pressing plate assembly that are disposed opposite each other and spaced apart in the first direction, where the first sliding groove is provided in the first pressing plate assembly, and the second sliding groove is provided in the second pressing plate assembly. A sliding way extending along the second direction is defined between the first pressing plate assembly and the second pressing plate assembly, and the flow regulation member is slidably connected to the sliding way in the second direction. It can be understood that the flow regulation member is located between the first sliding groove and the second sliding groove, the second portion located between the first sliding groove and the second sliding groove runs through the through groove of the flow regulation member, and the flow regulation member is slidably connected to the sliding way in the second direction. In this way, during operation, the drive mechanism can more smoothly drive the transmission member to move along the first direction and also stably drive the flow regulation member to move along the second direction.

In an embodiment, the first pressing plate assembly includes a first pressing plate and a first support plate that are disposed opposite each other and spaced apart in the second direction, and the first sliding groove is formed between the first pressing plate and the first support plate; a side wall of the first sliding groove includes a first side wall provided on the first pressing plate, the first side wall being provided with a first groove recessed toward a side away from the first support plate in the second direction; and the first rolling member is disposed in the first groove. Use of the first rolling member in the first groove can reduce a contact area between the transmission member and the first side wall, thereby helping the transmission member move along the first direction more smoothly; and/or the second pressing plate assembly includes a second pressing plate and a second support plate that are disposed opposite each other and spaced apart in the second direction, and the second sliding groove is formed between the second pressing plate and the second support plate; a side wall of the second sliding groove includes a second side wall provided on the second support plate, the second side wall being provided with a second groove recessed toward a side away from the second pressing plate in the second direction; and the first rolling member is disposed in the second groove. Use of the first rolling member in the second groove can reduce a contact area between the transmission member and the second side wall, thereby helping the transmission member move along the first direction more smoothly.

In an embodiment, the coating die further includes a gap regulation member, the gap regulation member movably running through the flow regulation member along the second direction, extending into the through groove, and abutting against the transmission member in the second direction. A position of the gap regulation member in the second direction can be regulated based on use requirements. For example, making the gap regulation member abut against the transmission member in the second direction can improve transmission accuracy of the transmission member.

In an embodiment, a second rolling member is disposed between the transmission member and the flow regulation member. The second rolling member can be used to reduce friction between the transmission member and the flow regulation member. This can allow a smoother conversion of the linear motion of the transmission member in the first direction into the linear motion of the flow regulation member in the second direction, thus facilitating improvement of sensitivity and accuracy of the coating die.

In an embodiment, the coating die further includes a controller, the controller being electrically connected to the drive mechanism, and the controller being configured to obtain the coating weight information of the slurry flowing out of the coating gap and control output of the drive mechanism according to the coating weight information. The coating weight information can be analyzed and compared with a preset value, and height of one flow regulation member in the second direction can be adjusted based on a difference between the coating weight information and the preset value, which helps a coating finally applied satisfy the requirements, thereby achieving closed-loop control.

In an embodiment, the coating die includes a plurality of regulation assemblies spaced apart in a third direction, and the controller is electrically connected to the drive mechanisms of the plurality of regulation assemblies to synchronously control output of all the drive mechanisms. The first direction, the second direction, and the third direction intersect with each other. After one flow regulation member has been regulated, the remaining flow regulation members are also regulated accordingly, which reduces an excessively large height difference between one flow regulation member and the remaining flow regulation members in the second direction. This helps make heights of the flow regulation members of the plurality of regulation assemblies in the second direction tend to be consistent, improving the weight consistency of the coating applied by the coating die, thereby improving the product quality.

In an embodiment, the flow regulation member includes an extrusion body running through the die body along the second direction and a flow blocking member disposed at a bottom end of the extrusion body. The coating gap has a first wall surface and a second wall surface disposed opposite each other in the second direction; and the flow blocking member has a limit position during movement of the flow regulation member in the second direction. When the flow blocking member is in the limit position, a bottom end of the flow blocking member runs through the first wall surface along the second direction and abuts against the second wall surface of the coating gap to block the coating gap. The flow blocking members of the flow regulation members of the plurality of regulation assemblies can all abut against the second wall surface of the coating gap as appropriate to needs (for example, when coating is stopped), to block the coating gap.

In an embodiment, the flow blocking member includes a body portion disposed at the bottom end of the extrusion body and protruding portions disposed on two opposite sides of the body portion in the third direction, the body portion and the protruding portion defining an engagement recess fitting with the protruding portion; and in two adjacent flow blocking members of two adjacent regulation assemblies, the protruding portion of one flow blocking member is in fit connection with the engagement recess of the other flow blocking member. The protruding portion is in fit connection with an adjacent engagement recess, so that the slurry is incapable of flowing out between two adjacent flow blocking members. On one hand, the flow of the slurry flowing out of the coating gap can be better regulated. On the other hand, the slurry flowing into the coating gap can also be better intercepted.

In an embodiment, the drive mechanism includes a servo driver. A higher output accuracy of the servo driver leads to a higher displacement accuracy of the flow regulation member, so that thickness of the coating (for example, an active substance layer) applied by the coating die can be controlled more accurately.

In an embodiment, the die body includes a first die head and a second die head disposed opposite each other in the second direction, and the coating gap is formed between the first die head and the second die head. The accommodating cavity is provided in the second die head, and the flow regulation member runs through the first die head along the second direction and is capable of running into the coating gap. The slurry in the accommodating cavity can flow into the coating gap between the first die head and the second die head, can flow out of the coating gap after the opening degree of the coating gap is regulated by the flow regulation member, and is then applied on an object to be coated.

In an embodiment, the first direction and the second direction are perpendicular to each other. The flow regulation member can move along a direction perpendicular to the longitudinal extension direction of the coating gap, so that a size of the coating gap in the second direction can be regulated and the opening degree of the coating gap can be regulated uniformly. As a result, the slurry can uniformly flow out of the coating gap, and thus the active substance layer applied by the coating die has high uniformity.

According to a second aspect of this application, a coating apparatus is provided, including the foregoing coating die.

According to a third aspect of this application, a battery production apparatus is provided, including the foregoing coating apparatus.

Details of one or more embodiments of this application are presented in the following accompanying drawings and descriptions. Other features, objectives, and advantages of this application become apparent from the specification, accompanying drawings and claims.

BRIEF DESCRIPTION OF DRAWINGS

Persons of ordinary skill in the art can clearly understand various other advantages and benefits by reading the detailed description of some embodiments below. To better describe and illustrate the embodiments and/or examples disclosed herein, reference may be made to one or more accompanying drawings. The additional details or examples used to describe the accompanying drawings should not be considered as any limitations on the scope of any of the claimed inventions, the embodiments and/or examples currently described, and the best mode of the inventions as currently understood.

Figure 1:
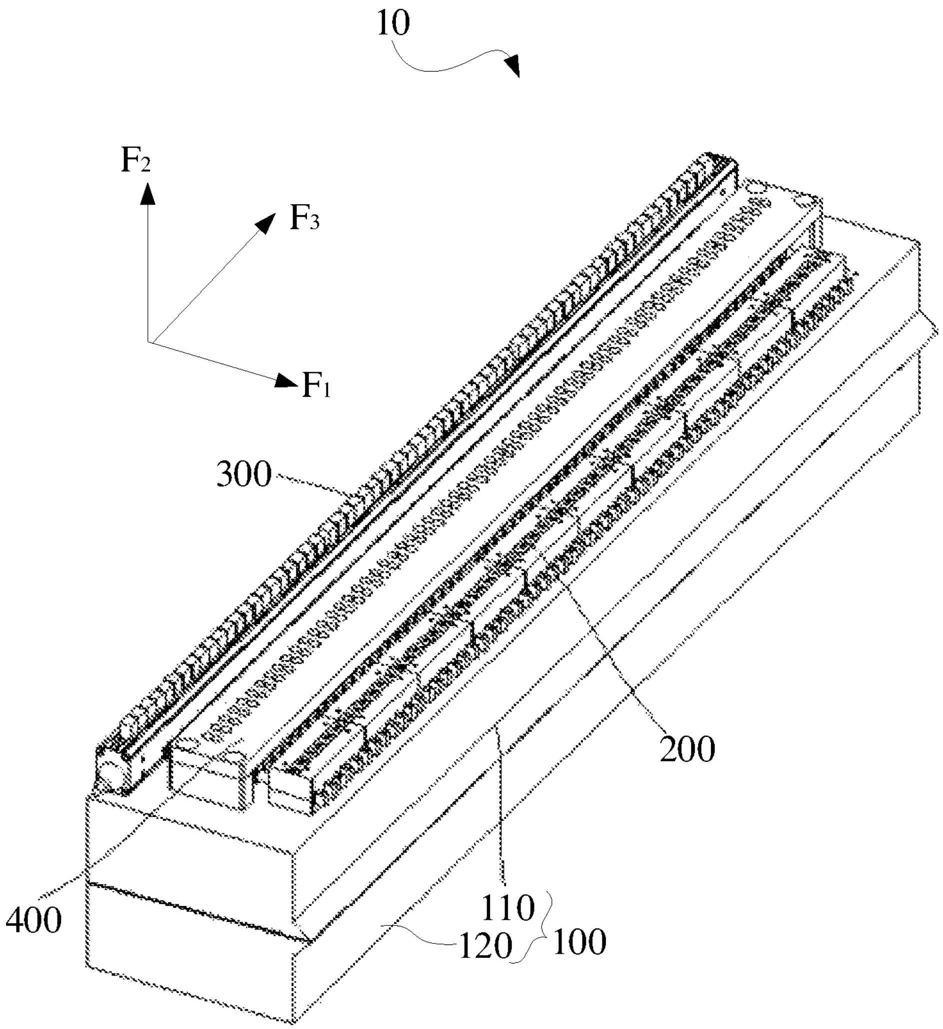
FIG. 1 is a schematic structural diagram of a coating die according to one or more embodiments.

Reference signs: 10. coating die; 100. die body; 110. first die head; 120. second die head; 130. sealing member; 1101. accommodating cavity; 1102. coating gap; 200. regulation assembly; 210. flow regulation member; 211. second inclined surface; 212. through groove; 213. extrusion body; 214. flow blocking member; 2141. body portion; 2142. protruding portion; 2143. engagement recess; 215. threaded hole; 220. transmission member; 221. first inclined surface;

222. first portion; 223. second portion; 224. third portion; 225. clamping recess; 230. drive mechanism; 240. guide member; 241. first sliding groove; 242. second sliding groove; 243. first pressing plate; 244. first support plate; 2441. plate body; 2442. support block; 245. second pressing plate; 246. second support plate; 247. sliding way; 248. gap regulation member; 249. coupler; 250. first rolling member; 260. second rolling member; 270. cover body; 300. controller; and 400. protective housing.

DESCRIPTION OF EMBODIMENTS

The following describes in detail the embodiments of technical solutions in this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application relates. The terms used herein are intended to merely describe the specific embodiments rather than to limit this application. The terms “include”, “comprise”, and “have” and any other variations thereof in the specification, claims and brief description of drawings of this application are intended to cover non-exclusive inclusions.

In the description of the embodiments of this application, the terms “first”, “second” and the like are merely intended to distinguish between different objects, and shall not be understood as any indication or implication of relative importance or any implicit indication of the number, particular sequence or primary-secondary relationship of the technical features indicated. In the description of the embodiments of this application, “a plurality of” means at least two unless otherwise specifically stated.

In this specification, reference to “embodiment” means that specific features, structures, or characteristics described with reference to the embodiment may be incorporated in at least one embodiment of this application. The word “embodiment” appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term “and/or” is only an associative relationship for describing associated objects, indicating that three relationships may be present. For example, 121A and/or 121B may indicate the following three cases: presence of only 121A, presence of both 121A and 121B, and presence of only 121B. In addition, the character “/” in this specification generally indicates an “or” relationship between contextually associated objects. In this disclosure, the phrases “at least one of A, B, and C” and “at least one of A, B, or C” both mean only A, only B, only C, or any combination of A, B, and C.

In the description of the embodiments of this application, the term “a plurality of” means more than two (inclusive). Similarly, “a plurality of groups” means more than two (inclusive) groups, and “a plurality of pieces” means more than two (inclusive) pieces.

In the description of the embodiments of this application, the orientations or positional relationships indicated by the technical terms “center”, “longitudinal”, “transverse”, “length”, “width”, “thickness”, “upper”, “lower”, “front”, “rear”, “left”, “right”, “vertical”, “horizontal”, “top”, “bottom”, “inside”, “outside”, “clockwise”, “counterclockwise”, “axial”, “radial”, “circumferential”, and the like are based on the orientations or positional relationships as shown in the accompanying drawings. These terms are merely for the ease and brevity of description of the embodiments of this application rather than indicating or implying that the apparatuses or components mentioned must have specific orientations or must be constructed or manipulated according to specific orientations, and therefore shall not be construed as any limitations on the embodiments of this application.

In the description of the embodiments of this application, unless otherwise specified and defined explicitly, the terms “mount”, “connect”, “join”, and “fasten” should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in the embodiments of this application as appropriate to specific situations.

It has been found through research that the reason for the poor uniformity of an active substance layer applied by a conventional coating apparatus is that thickness of an active substance layer applied on an electrode plate is directly related to flow of slurry extruded by a coating die of the coating apparatus, but the coating die of the conventional coating apparatus regulates the flow of the slurry extruded by the coating die based on pressure sensed by a pressure sensor, where the pressure sensed by the pressure sensor is susceptible to environmental factors, resulting in fluctuations of the flow of the slurry extruded by the coating die of the conventional coating apparatus.

To solve the problem that the flow of the slurry extruded by the coating die of the conventional coating apparatus is prone to fluctuations, a coating die is designed in this application, where the flow of the slurry flowing out of the coating gap can be regulated by moving a flow regulation member along a direction intersecting with a longitudinal extension direction of the coating gap, and displacement of the flow regulation member after regulation is not affected by the environment. Therefore, the flow of the slurry flowing out of the coating gap is less prone to fluctuations.

A coating die, coating apparatus, and/or battery production apparatus disclosed in the embodiments of this application may be used without limitation in production and manufacturing of battery.

Figure 2:
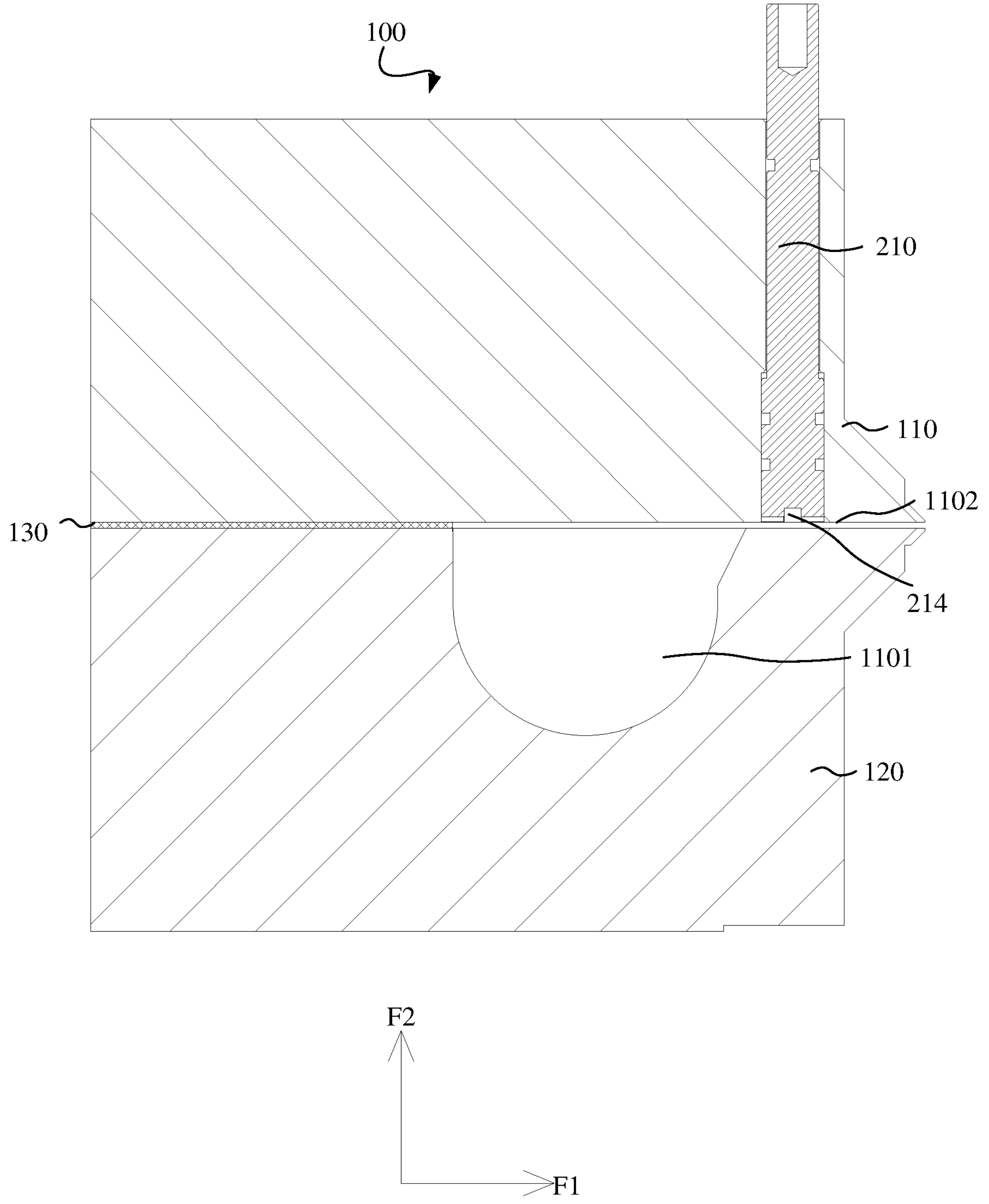
FIG. 2 is a schematic diagram showing structures of a die body and a flow regulation member according to one or more embodiments (when the flow regulation member is not pressed).
Figure 3:
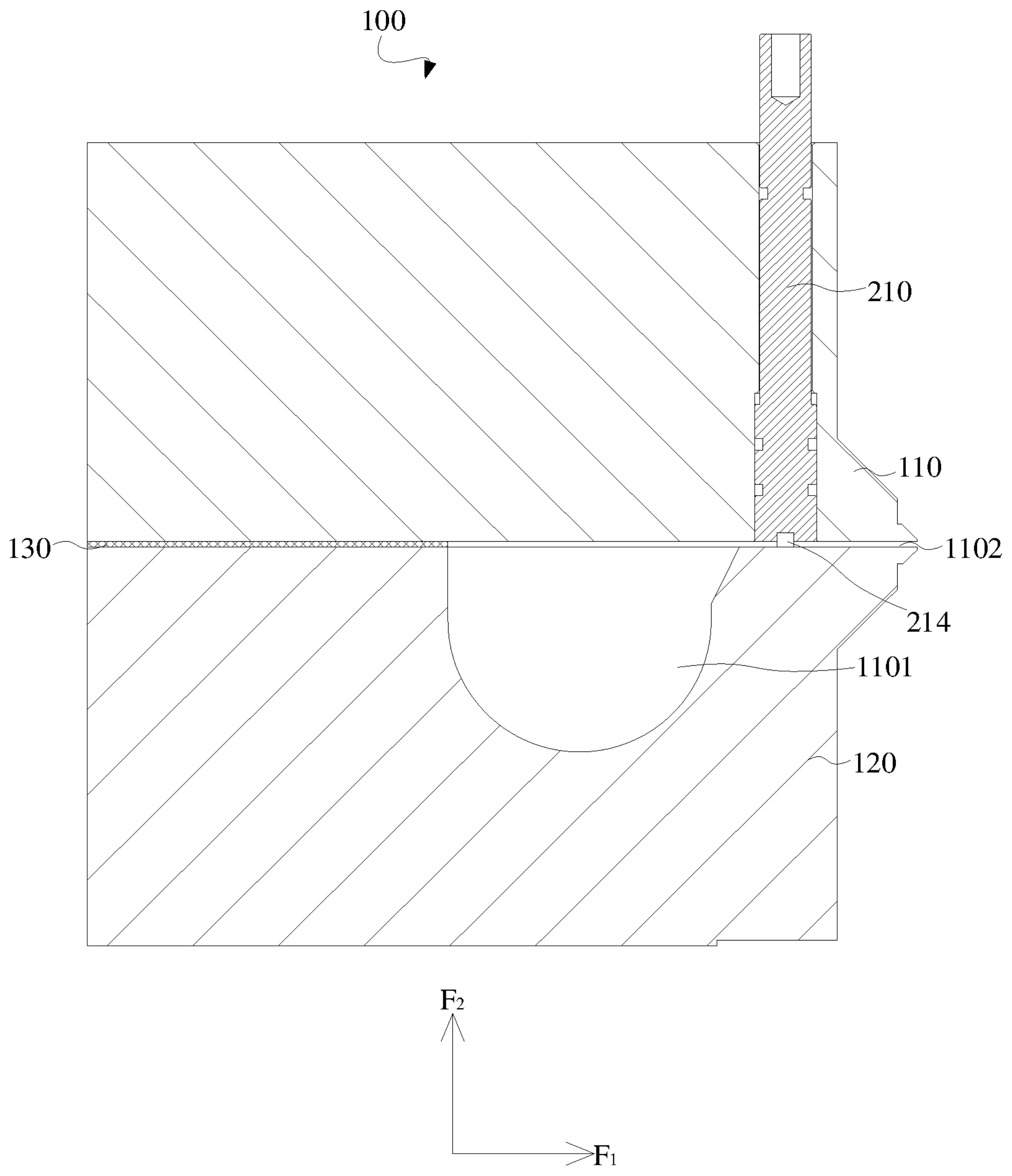
FIG. 3 is a schematic diagram showing structures of a die body and a flow regulation member according to one or more embodiments (when the flow regulation member is pressed).

FIG. 1 is a schematic structural diagram of a coating die according to an embodiment of this application. FIG. 2 and FIG. 3 are schematic diagrams showing structures of a die body and a flow regulation member when the flow regulation member is not pressed and when the flow regulation member is pressed, respectively.

Referring to FIG. 1, a coating die 10 provided in an embodiment of this application includes a die body 100 and at least one regulation assembly 200. Referring to FIG. 2 and FIG. 3, an accommodating cavity 1101 for accommodating a slurry is provided in the die body 100, and the die body 100 is further provided with a coating gap 1102 communicating with the accommodating cavity 1101 and extending along a first direction $F_1$.

Each regulation assembly 200 includes a flow regulation member 210 running through the die body 100 along a second direction $F_2$ and capable of running into the coating gap 1102, where the flow regulation member 210 is configured to move along the second direction $F_2$ relative to the die body 100 so as to regulate flow of a slurry flowing out of the coating gap 1102.

The die body 100 refers to a component having the accommodating cavity 1101 and the coating gap 1102, where the accommodating cavity 1101 is configured to accommodate the slurry, and the accommodating cavity 1101 may have a preset negative pressure such that the slurry in the accommodating cavity 1101 is extruded out of the coating gap 1102 to be applied.

The die body 100 may be further provided with a feeding hole communicating with the accommodating cavity 1101, where the slurry can flow into the accommodating cavity 1101 through the feeding hole.

The flow regulation member 210 extends along the second direction $F_2$ and runs through the die body 100. An end of the flow regulation member 210 running into the die body 100 can run into the coating gap 1102.

A drive member outside the coating die 10 may provide a driving force to enable the flow regulation member 210 to move along the second direction $F_2$, that is, the drive member outside the coating die 10 drives the flow regulation member 210 to move along the second direction $F_2$; or a drive mechanism 230 of the coating die 10 provides such driving force, that is, the drive mechanism 230 of the coating die 10 drives the flow regulation member 210 to move along the second direction $F_2$. This is not specifically limited herein.

The first direction $F_1$ and the second direction $F_2$ intersect with each other, meaning that the first direction $F_1$ and the second direction $F_2$ may be perpendicular to each other. For example, the first direction $F_1$ is parallel to a length direction or width direction of the die body 100, and the second direction $F_2$ is parallel to a thickness direction of the die body 100. For example, the first direction $F_1$ is parallel to the width direction of the die body 100, and the second direction $F_2$ is parallel to the thickness direction of the die body 100.

With the first direction $F_1$ and the second direction $F_2$ intersecting with each other, when the flow regulation member 210 moves along the second direction $F_2$, that is, when the flow regulation member 210 moves along a direction intersecting with the longitudinal extension direction of the coating gap 1102, the flow regulation member 210 can extend into the coating gap 1102. In this way, a size of the coating gap 1102 in the second direction $F_2$ can be regulated, that is, an opening degree of the coating gap 1102 can be regulated. Thus, the flow of the slurry flowing out of the coating gap 1102 can be regulated, and the flow regulation member 210 after regulation is not affected by the environment, so that the slurry can flow out of the coating gap 1102 stably.

Figure 4:
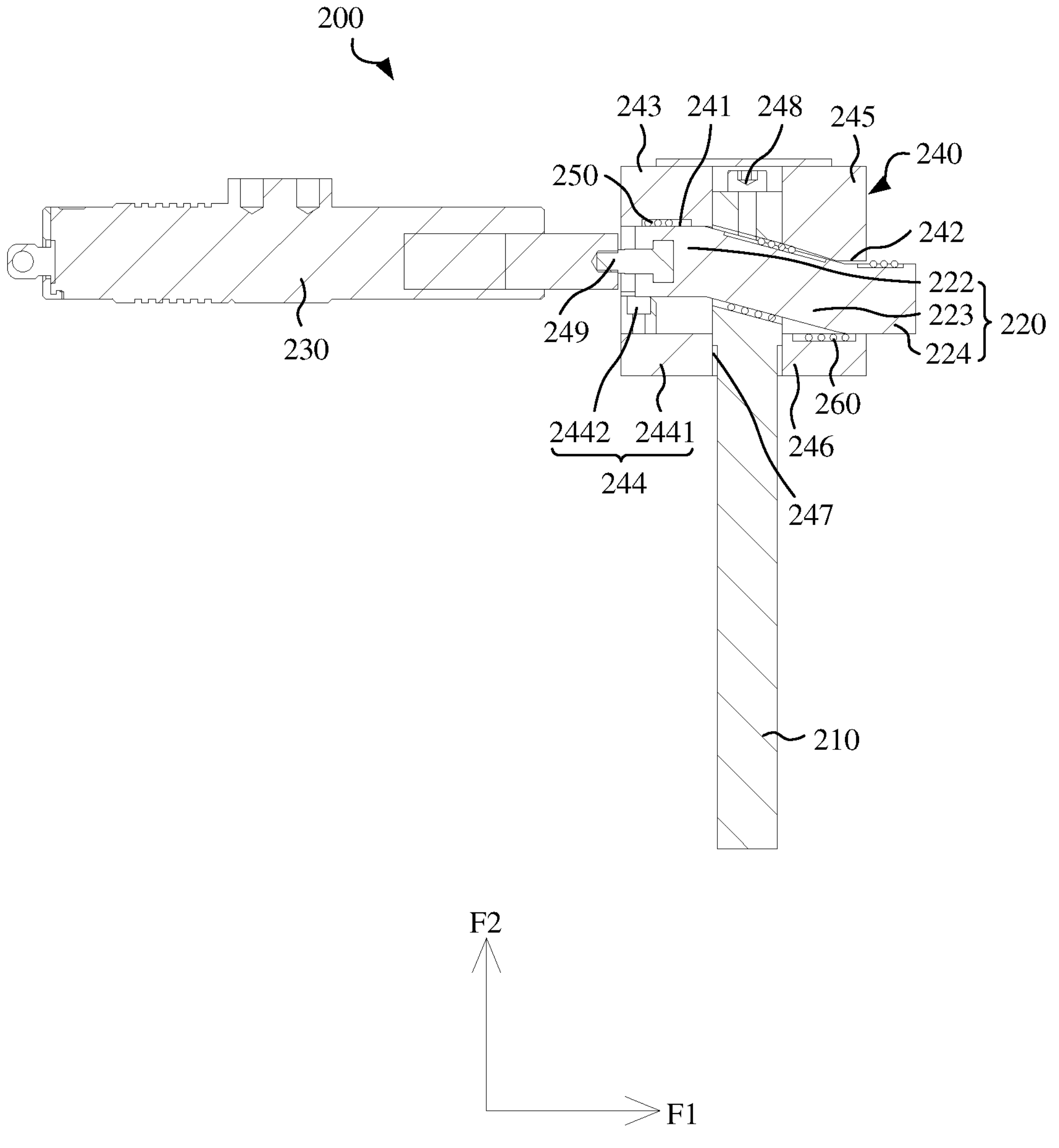
FIG. 4 is a schematic structural diagram of a regulation assembly according to one or more embodiments.

Referring to FIG. 4, each regulation assembly further includes a drive mechanism 230, the drive mechanism 230 being connected to an end of the flow regulation member 210 extending out of the die body 100 so as to drive the flow regulation member 210 to move along the second direction $F_2$.

The drive mechanism 230 may be a motor or a cylinder. Certainly, the drive mechanism 230 may alternatively be another component capable of driving the flow regulation member 210 to move along the second direction $F_2$.

The drive mechanism 230 is configured to drive the flow regulation member 210 to move along the second direction $F_2$, so that the opening degree of the coating gap 1102 can be regulated and the flow of the slurry flowing out of the coating gap 1102 can be regulated as well.

The drive mechanism is configured to be able to regulate displacement of the flow regulation member in the second direction according to coating weight information of the slurry flowing out of the coating gap.

In this way, the coating weight information can be analyzed and compared with a preset value, and height of one flow regulation member in the second direction can be adjusted based on a difference between the coating weight information and the preset value, which helps a coating finally applied satisfy the requirements, thereby achieving closed-loop control.

In some embodiments, each regulation assembly 200 further includes a transmission member 220, and the drive mechanism 230 is connected to the end of the flow regulation member 210 extending out of the die body 100 via the transmission member 220 so as to drive, via the transmission member 220, the flow regulation member 210 to move a preset distance along the second direction $F_2$ per unit time.

The “transmission member 220” refers to a component configured to transfer a driving force, to the flow regulation member 210, for driving the flow regulation member 210 to move along the second direction $F_2$.

The drive mechanism 230 drives, via the transmission member 220, the flow regulation member 210 to move the preset distance along the second direction $F_2$ per unit time, so that the opening degree of the coating gap 1102 can be regulated more accurately, and thus the flow of the slurry flowing out of the coating gap 1102 can be regulated more accurately.

In some embodiments, the transmission member 220 moves along the first direction $F_1$ under a driving force of the drive mechanism 230 and drives the flow regulation member 210 to move along the second direction $F_2$. In a same time period, the transmission member 220 has a displacement of A in the first direction $F_1$, and the flow regulation member 210 has a displacement of B in the second direction $F_2$, where $A>B$.

In the process of the drive mechanism 230 driving, via the transmission member 220, the flow regulation member 210 to move along the second direction $F_2$, with $A>B$, it can be understood that compared with the displacement of the transmission member 220 in the first direction $F_1$, the displacement of the flow regulation member 210 in the second direction $F_2$ is smaller. This is conducive to improvement of the displacement accuracy of the flow regulation member 210, so that the flow of the slurry flowing out of the coating gap 1102 can be regulated more accurately.

In some embodiments, a ratio of A to B is C, where $C>5$, for example, C may be 10. A larger C can better improve the displacement accuracy of the flow regulation member 210.

Figure 5:
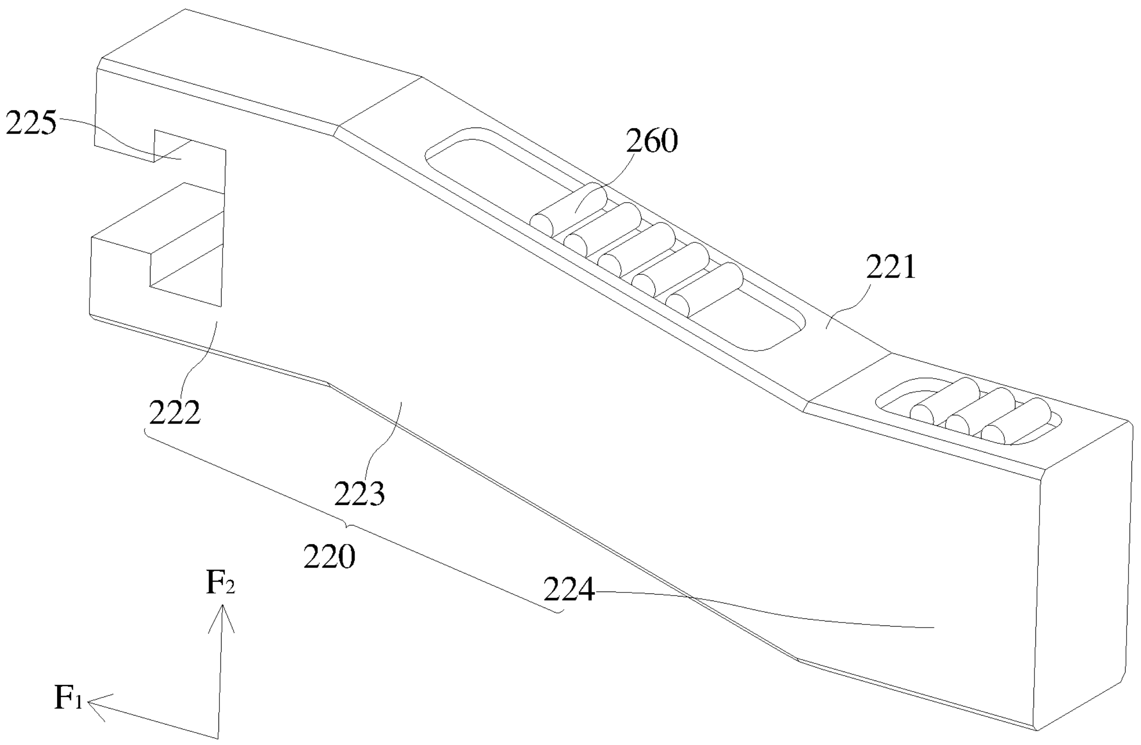
FIG. 5 is a schematic structural diagram of a transmission member according to one or more embodiments.
Figure 6:
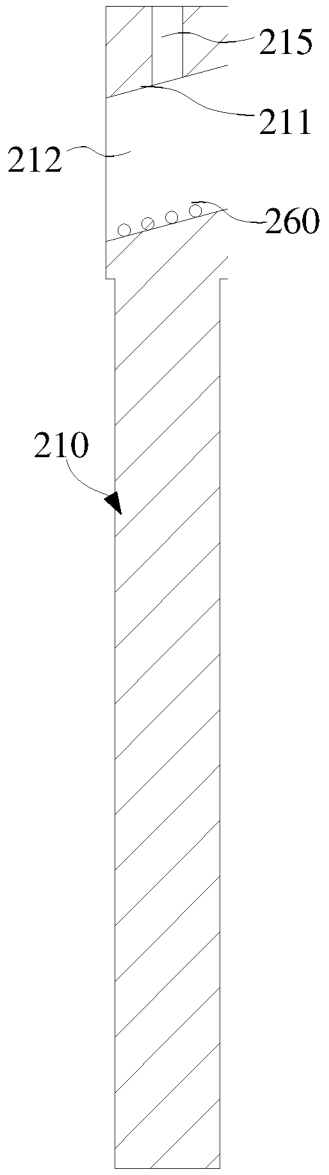
FIG. 6 is a schematic structural diagram of a flow regulation member according to one or more embodiments.

In some embodiments, referring to FIG. 5, the transmission member 220 has a first inclined surface 221 at an angle to both the first direction $F_1$ and the second direction $F_2$. Referring to FIG. 6, the flow regulation member 210 has a second inclined surface 211 parallel to the first inclined surface 221, where the first inclined surface 221 fits with the second inclined surface 211 to convert linear motion of the transmission member 220 in the first direction $F_1$ into linear motion of the flow regulation member 210 in the second direction $F_2$.

As the first inclined surface 221 is disposed at the angle to both the first direction $F_1$ and the second direction $F_2$, it can be understood that when the drive mechanism 230 drives the transmission member 220 to move along the first direction $F_1$, the transmission member 220 can be well assisted by the first inclined surface 221 and the second inclined surface 211 to enable the flow regulation member 210 to move along the second direction $F_2$.

In some embodiments, referring to FIG. 4 and FIG. 5, the transmission member 220 includes a first portion 222 connected to the corresponding drive mechanism 230 and extending along the first direction $F_1$ and a second portion 223 connected to a side of the first portion 222 away from the corresponding drive mechanism 230, and the first inclined surface 221 is provided on the second portion 223.

The "first portion 222" refers to a portion provided on the transmission member 220 and configured to connect to the corresponding drive mechanism 230.

The "second portion 223" refers to a portion having the first inclined surface 221 on the transmission member 220, that is, the first inclined surface 221 of the second portion 223 fits with the second inclined surface 211 to convert linear motion of the transmission member 220 in the first direction $F_1$ into linear motion of the flow regulation member 210 in the second direction $F_2$.

In this way, during operation, the drive mechanism 230 can drive the transmission member 220 to move along the first direction $F_1$ and convert the linear motion of the transmission member 220 in the first direction $F_1$ into the linear motion of the flow regulation member 210 in the second direction $F_2$ under cooperation between the first inclined surface 221 of the second portion 223 and the second inclined surface 211.

In some embodiments, referring to FIG. 6, the flow regulation member 210 has a through groove 212 for the second portion 223 to run through, and the second inclined surface 211 is provided on a side wall of the through groove 212.

It can be understood that the second inclined surface 211 on the side wall of the through groove 212 fits with the second inclined surface 211 of the second portion 223, and the second portion 223 runs through the through groove 212, facilitating a more stable conversion of the linear motion of the transmission member 220 in the first direction $F_1$ into the linear motion of the flow regulation member 210 in the second direction $F_2$, thereby improving the transmission effect of the transmission member 220.

In some embodiments, two opposite sides of the second portion 223 in the second direction $F_2$ are each provided with the first inclined surface 221, and the side wall of the through groove 212 of the flow regulation member 210 is provided with two second inclined surfaces 211 in one-to-one correspondence with the first inclined surfaces 221.

In this way, under cooperation between the first inclined surface 221 and the corresponding second inclined surface 211, the drive mechanism 230 converts the linear motion of the transmission member 220 in the first direction $F_1$ into the linear motion of the flow regulation member 210 in the second direction $F_2$. The two opposite sides of the second portion 223 in the second direction $F_2$ are each provided with the first inclined surface 221, allowing a better transmission effect of the transmission member 220.

In some embodiments, referring to FIG. 4, the coating die 10 further includes a guide member 240, and the first portion 222 is slidably connected to the guide member 240 in the first direction $F_1$.

With such arrangement, during operation of the drive mechanism 230, the first portion 222 can move directionally along the first direction $F_1$ relative to the guide member 240, which facilitates improvement of reliability of the coating die 10.

In some embodiments, referring to FIG. 4, the guide member 240 has a first sliding groove 241 and a second sliding groove 242 spaced apart in the first direction $F_1$ and communicating with each other, and the transmission member 220 further includes a third portion 224 connected to a side of the second portion 223 away from the first portion 222. The first portion 222 is slidably connected to the first sliding groove 241 in the first direction $F_1$, and the third portion 224 is slidably connected to the second sliding groove 242 in the first direction $F_1$.

As the first portion 222 is slidably connected to the first sliding groove 241 in the first direction $F_1$, the third portion 224 is slidably connected to the second sliding groove 242 in the first direction $F_1$, and the first sliding groove 241 and the second sliding groove 242 communicate with each other, it can be understood that the second portion 223 is located between the first sliding groove 241 and the second sliding groove 242, and the first inclined surface 221 of the flow regulation member 210 is also located between the first sliding groove 241 and the second sliding groove 242.

The guide member 240 is substantially Z-shaped; and both the first portion 222 and the third portion 224 extend along the first direction $F_1$, a gap in the second direction $F_2$ is present between the first portion 222 and the third portion 224, and the second portion 223 connected between the first portion 222 and the third portion 224 is inclined and provided with the first inclined surface 221, facilitating transmission connection between the second portion 223 and the corresponding flow regulation member 210.

In this way, during operation, the drive mechanism 230 can more stably drive the transmission member 220 to move directionally along the first direction $F_1$, which helps better drive the flow regulation member 210 to move along the second direction $F_2$.

In some embodiments, the first portion 222 is provided with a clamping recess 225; and each regulation assembly 200 further includes a coupler 249 connected to an output end of the corresponding drive mechanism 230, where an end of the coupler 249 away from the output end of the drive mechanism 230 is clamped in the clamping recess 225.

Such arrangement can improve firm connection between the first portion 222 and the output end of the drive mechanism 230, facilitating improvement of transmission reliability of the regulation assembly 200 to some extent.

In some embodiments, a first rolling member 250 is disposed on a side wall of at least one of the first sliding groove 241 and the second sliding groove 242, the first rolling member 250 being configured to be able to rotate under driving of the transmission member 220 moving along the first direction $F_1$.

The first rolling member 250 has a central axis parallel to a third direction $F_3$. The first direction $F_1$, the second direction $F_2$, and the third direction $F_3$ are perpendicular to each other. The first rolling member 250 may be a ball or a needle roller.

Use of the first rolling member 250 can reduce contact areas between the transmission member 220 and the side wall of the first sliding groove 241, between the transmission member 220 and the side wall of the first sliding groove 241 and the side wall of the second sliding groove 242, or between the transmission member 220 and the side wall of the second sliding groove 242, so that a smaller friction coefficient is present between the guide member 240 and the transmission member 220. This can allow the transmission member 220 to move along the first direction $F_1$ more stably and more smoothly, thus facilitating improvement of sensitivity and accuracy of the coating die 10.

In some embodiments, the guide member 240 includes a first pressing plate assembly and a second pressing plate assembly that are disposed opposite each other and spaced apart in the first direction $F_1$, where the first sliding groove 241 is provided in the first pressing plate assembly, and the second sliding groove 242 is provided in the second pressing plate assembly. A sliding way 247 extending along the second direction $F_2$ is defined between the first pressing plate assembly and the second pressing plate assembly, and the flow regulation member 210 is slidably connected to the sliding way 247 in the second direction $F_2$.

It can be understood that the flow regulation member 210 is located between the first sliding groove 241 and the second sliding groove 242, the second portion 223 located between the first sliding groove 241 and the second sliding groove 242 runs through the through groove 212 of the flow regulation member 210, and the flow regulation member 210 is slidably connected to the sliding way 247 in the second direction $F_2$. In this way, during operation, the drive mechanism 230 can more smoothly drive the transmission member 220 to move along the first direction $F_1$ and also stably drive the flow regulation member 210 to move along the second direction $F_2$.

In some embodiments, referring to FIG. 4, the first pressing plate assembly includes a first pressing plate 243 and a first support plate 244 that are disposed opposite each other and spaced apart in the second direction, and the first sliding groove 241 is formed between the first pressing plate 243 and the first support plate 244. The side wall of the first sliding groove 241 includes a first side wall provided on the first pressing plate 243, where the first side wall is provided with a first groove recessed toward a side away from the first support plate 244 in the second direction, and the first rolling member 250 is disposed in the first groove.

Use of the first rolling member 250 in the first groove can reduce a contact area between the transmission member 220 and the first side wall, thereby helping the transmission member 220 move along the first direction $F_1$ more smoothly.

In this embodiment, the first support plate 244 includes a plate body 2441 and a support block 2442 disposed on the plate body 2441, where a friction coefficient of the support block 2442 is lower than a preset value. The support block 2442 may be made of copper, which helps reduce a friction coefficient between the first support plate 244 and the transmission member 220.

In some other embodiments, referring to FIG. 4, the second pressing plate assembly includes a second pressing plate 245 and a second support plate 246 that are disposed opposite each other and spaced apart in the second direction, and the second sliding groove 242 is formed between the second pressing plate 245 and the second support plate 246. The side wall of the second sliding groove 242 includes a second side wall provided on the second support plate 246, where the second side wall is provided with a second groove recessed toward a side away from the second pressing plate 245 in the second direction, and the first rolling member 250 is disposed in the second groove.

Use of the first rolling member 250 in the second groove can reduce a contact area between the transmission member 220 and the second side wall, thereby helping the transmission member 220 move along the first direction $F_1$ more smoothly.

In still some other embodiments, a part of the first rolling member 250 is disposed in the first groove, and another part of the first rolling member 250 is provided in the second groove.

In this way, it is more favorable for the transmission member 220 to move along the first direction $F_1$ more smoothly.

In some embodiments, referring to FIG. 4, the coating die 10 further includes a gap regulation member 248, the gap regulation member 248 movably running through the flow regulation member 210 along the second direction $F_2$, extending into the through groove 212, and abutting against the transmission member 220 in the second direction $F_2$.

A position of the gap regulation member 248 in the second direction $F_2$ can be regulated based on use requirements. For example, making the gap regulation member 248 abut against the transmission member 220 in the second direction $F_2$ can improve transmission accuracy of the transmission member 220.

In some embodiments, the flow regulation member 210 is provided with a threaded hole 215 extending along the second direction $F_2$, and the gap regulation member 248 is in threaded connection with the flow regulation member 210 and extends into the through groove 212.

The gap regulation member 248 can be rotated as appropriate to needs such that the gap regulation member 248 abuts against the transmission member 220 in the second direction $F_2$ so as to improve the transmission accuracy of the transmission member 220.

In some embodiments, a second rolling member 260 is disposed between the transmission member 220 and the flow regulation member 210.

The second rolling member 260 may be a ball, a needle roller, or another rolling member capable of rotating around an axis parallel to the third direction $F_3$.

"The second rolling member 260 is disposed between the transmission member 220 and the flow regulation member 210" may mean that the second rolling member 260 is disposed on the first inclined surface 221 of the transmission member 220. This may alternatively mean that the second rolling member 260 is disposed on the second inclined surface 211 of the flow regulation member 210. This may alternatively mean that the second rolling member 260 is disposed on the first inclined surface 221 of the transmission member 220, and the second rolling member 260 is disposed on the second inclined surface 211 of the flow regulation member 210.

The second rolling member 260 can be used to reduce friction between the transmission member 220 and the flow regulation member 210. This can allow a smoother conversion of the linear motion of the transmission member 220 in the first direction $F_1$ into the linear motion of the flow regulation member 210 in the second direction $F_2$, thus facilitating improvement of sensitivity and accuracy of the coating die 10.

In some embodiments, the coating die 10 further includes a controller 300, the controller 300 being electrically connected to the drive mechanism 230, and the controller 300 being configured to obtain the coating weight information of the slurry flowing out of the coating gap 1102 and control output of the drive mechanism 230 according to the coating weight information.

The coating weight information refers to weight data per unit area of a coating formed by the slurry flowing out of the coating gap 1102 on an object to be coated per unit area.

The object to be coated may be a current collector. The coating may be an active substance layer.

The coating weight information can be analyzed and compared with a preset value, and height of one flow regulation member 210 in the second direction $F_2$ can be adjusted according to a difference between the coating weight information and the preset value, which helps a coating finally applied satisfy the requirements, thereby achieving closed-loop control.

Figure 7:
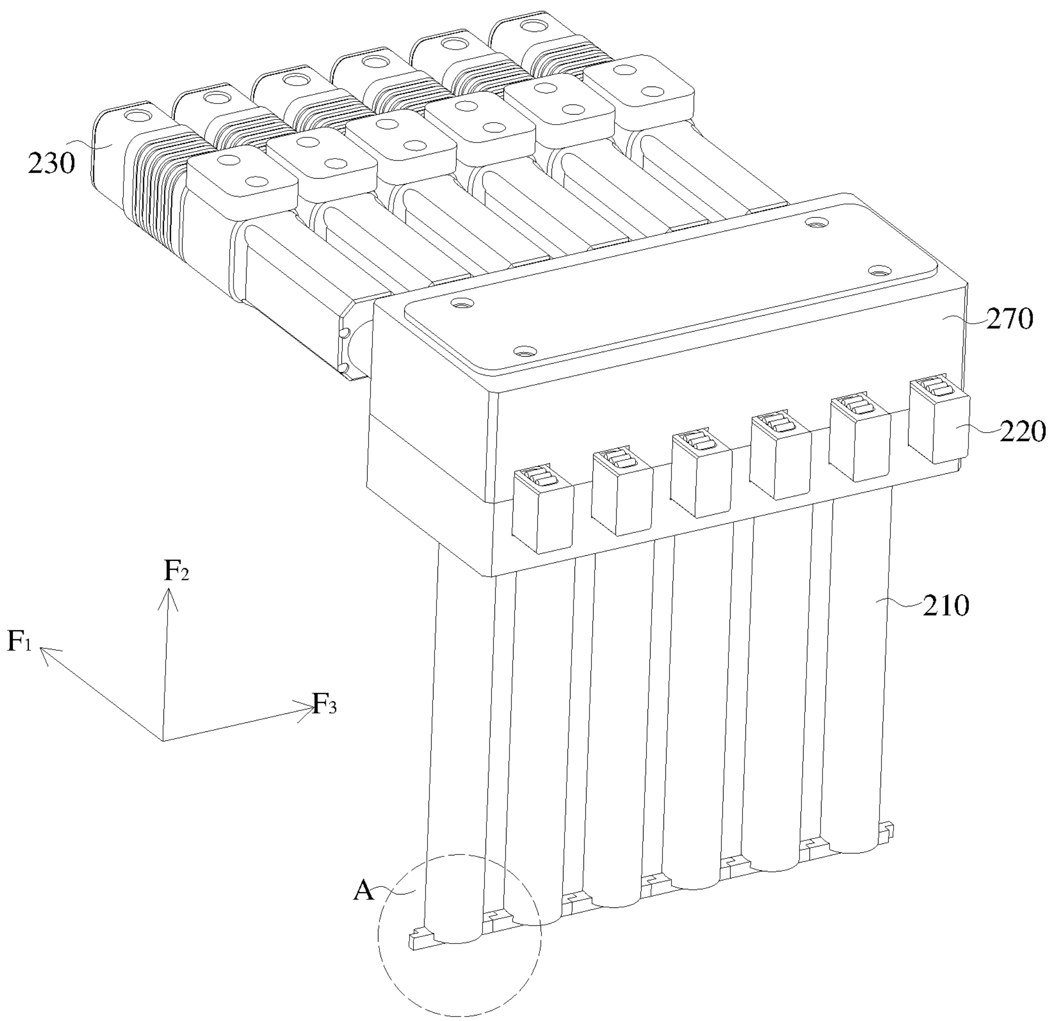
FIG. 7 is a schematic structural diagram of a plurality of regulation assemblies according to one or more embodiments.

In some embodiments, the coating die 10 includes a controller 300 and a plurality of regulation assemblies 200 spaced apart in the third direction $F_3$ (as shown in FIG. 7), where the controller 300 is electrically connected to the drive mechanisms 230 of the plurality of regulation assemblies 200 to synchronously control output of all the drive mechanisms 230. The first direction $F_1$, the second direction $F_2$, and the third direction $F_3$ intersect with each other.

This means that the first direction $F_1$, the second direction $F_2$, and the third direction $F_3$ may be perpendicular to each other. For example, the first direction $F_1$ is parallel to a width direction of the die body 100, the second direction $F_2$ is parallel to a thickness direction of the die body 100, and the third direction $F_2$ is parallel to a length direction of the die body 100.

After one flow regulation member 210 has been regulated, the remaining flow regulation members 210 are also regulated accordingly, which reduces an excessively large height difference between one flow regulation member 210 and the remaining flow regulation members 210 in the second direction $F_2$. This helps make heights of the flow regulation members 210 of the plurality of regulation assemblies 200 in the second direction $F_2$ tend to be consistent, improving the weight consistency of the coating applied by the coating die 10, thereby improving the product quality.

Figure 8:
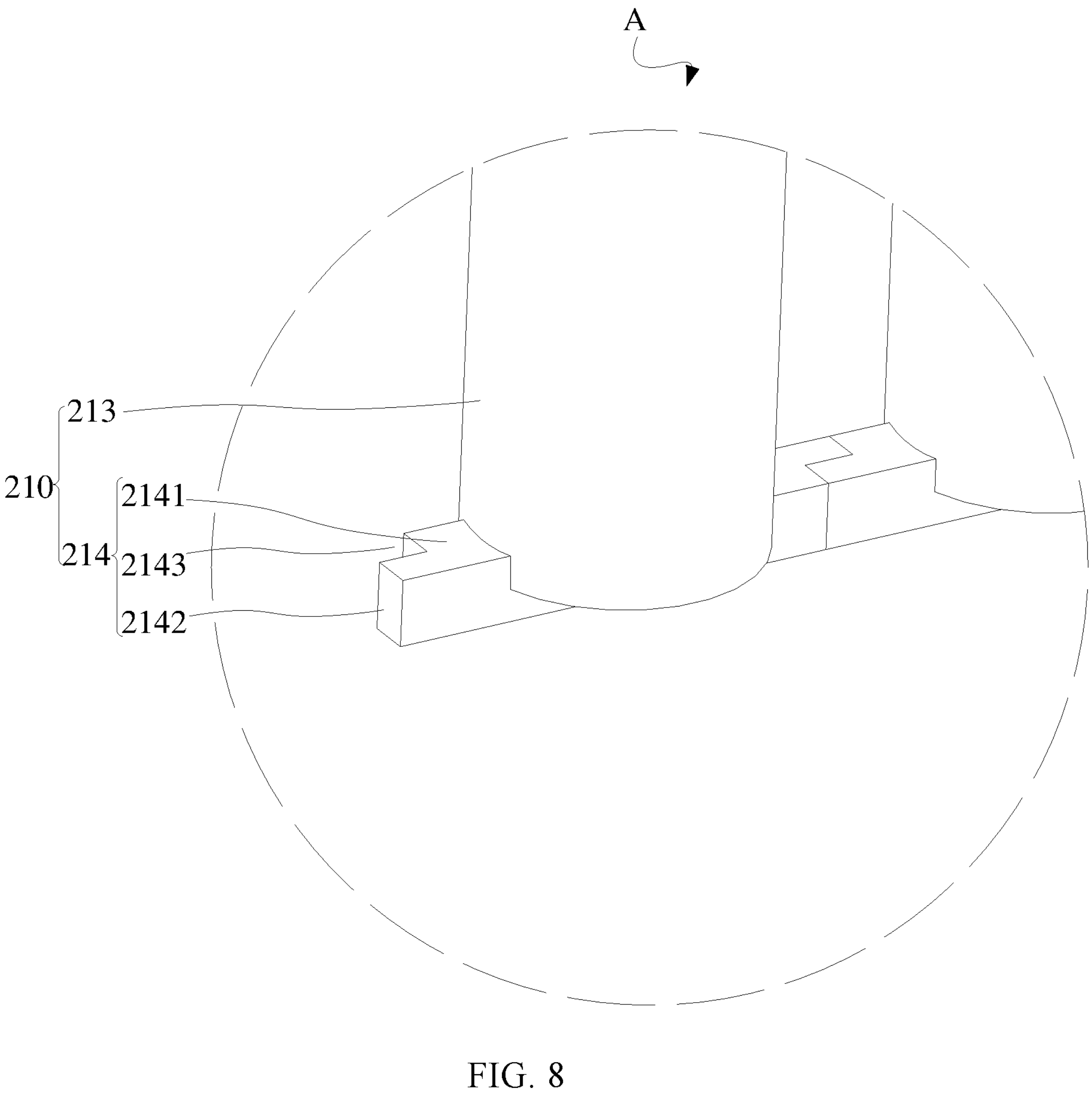
FIG. 8 is an enlarged schematic diagram of part A in FIG. 7.

In some embodiments, referring to FIG. 8, the flow regulation member 210 includes an extrusion body 213 running through the die body 100 along the second direction $F_2$ and a flow blocking member 214 disposed at a bottom end of the extrusion body 213. Referring to FIG. 3, the coating gap 1102 has a first wall surface and a second wall surface disposed opposite each other in the second direction $F_2$; the flow blocking member 214 has a limit position during movement of the flow regulation member 210 in the second direction $F_2$; and when the flow blocking member 214 is in the limit position, a bottom end of the flow blocking member 214 runs through the first wall surface along the second direction $F_2$ and abuts against the second wall surface of the coating gap 1102 to block the coating gap 1102.

In other words, when the flow blocking members 214 of the flow regulation members 210 of the plurality of regulation assemblies 200 all abut against the second wall surface of the coating gap 1102, the slurry flowing into the coating gap 1102 is intercepted by the flow blocking members 214 of the flow regulation members 210 of the plurality of regulation assemblies 200.

The flow blocking members 214 of the flow regulation members 210 of the plurality of regulation assemblies 200 can all abut against the second wall surface of the coating gap 1102 as appropriate to needs (for example, when coating is stopped), to block the coating gap 1102.

In some embodiments, the flow blocking member 214 has a flow blocking surface abutting against the second wall surface. When the flow blocking surfaces of the flow blocking members 214 of multiple flow regulation members 210 all abut against the second wall surface of the coating gap 1102, the slurry flowing into the coating gap 1102 is intercepted by the flow blocking members 214 of the flow regulation members 210 of the plurality of regulation assemblies 200.

In some embodiments, referring to FIG. 8, the flow blocking member 214 includes a body portion 2141 disposed at the bottom end of the extrusion body 213 and protruding portions 2142 disposed on two opposite sides of the body portion 2141 in the third direction $F_3$, the body portion 2141 and the protruding portion 2142 defining an engagement recess 2143 fitting with the protruding portion 2142; and in two adjacent flow blocking members 214 of two adjacent regulation assemblies 200, the protruding portion 2142 of one flow blocking member 214 is in fit connection with the engagement recess 2143 of the other flow blocking member 214.

The protruding portion 2142 is in fit connection with adjacent engagement recesses 2143, so that the slurry is incapable of flowing out between two adjacent flow blocking members 214, and the slurry flowing into the coating gap 1102 can be better intercepted.

In some embodiments, the drive mechanism 230 includes a servo driver.

A higher output accuracy of the servo driver leads to a higher displacement accuracy of the flow regulation member 210, so that thickness of the coating (for example, an active substance layer) applied by the coating die 10 can be controlled more accurately.

In some embodiments, the die body 100 includes a first die head 110 and a second die head 120 disposed opposite each other in the second direction $F_2$, the coating gap 1102 is formed between the first die head 110 and the second die head 120, the accommodating cavity 1101 is provided in the second die head 120, and the flow regulation member 210 runs through the first die head 110 along the second direction $F_2$ and is capable of running into the coating gap 1102.

The feeding hole may be provided in the second die head 120. The slurry flows into the accommodating cavity 1101 through the feeding hole. The slurry in the accommodating cavity 1101 can flow into the coating gap 1102 between the first die head 110 and the second die head 120, can flow out of the coating gap 1102 after the opening degree of the coating gap 1102 is regulated by the flow regulation member 210, and is then applied on the object to be coated.

It should be noted that the opening degree of the coating gap 1102 refers to a distance between the flow regulation member 210 and the second die head 120 in the second direction $F_2$, that is, a distance between the flow regulation member 210 and the second wall surface in the second direction $F_2$.

In some embodiments, the die body 100 further includes a sealing member 130, where the sealing member 130 is disposed between the first die head 110 and the second die head 120 and surrounds the accommodating cavity 1101, and the sealing member 130 can alleviate leakage of the slurry in a space other than the coating gap 1102 between the first die head 110 and the second die head 120, improving reliability of the coating die 10.

In some embodiments, the first direction $F_1$ and the second direction $F_2$ are perpendicular to each other.

As the first direction $F_1$ and the second direction $F_2$ are perpendicular to each other, when the drive mechanism 230 drives the flow regulation member 210 to move along the second direction $F_2$, that is, when the drive mechanism 230 drives the flow regulation member 210 to move along a direction perpendicular to the longitudinal extension direction of the coating gap 1102, a size of the coating gap 1102 in the second direction $F_2$ can be regulated, and the opening degree of the coating gap 1102 can be uniformly regulated. As a result, the slurry can uniformly flow out of the coating gap 1102, and thus the active substance layer applied by the coating die 10 has high uniformity.

In some embodiments, the plurality of regulation assemblies 200 are divided into multiple groups, where the first pressing plates 243 of the guide members 240 of the regulation assemblies 200 in a same group are integrally connected, plate bodies 2441 of the guide members 240 of the regulation assemblies 200 in the same group are integrally connected, the second pressing plates 245 of the guide members 240 of the regulation assemblies 200 in the same group are integrally connected, and the second support plates 246 of the guide members 240 of the regulation assemblies 200 in the same group are integrally connected, so as to form a cover body 270 through connection.

In some embodiments, referring to FIG. 1, the coating die 10 further includes a protective housing 400, where the protective housing 400 covers outer sides of the drive mechanisms 230 of all the regulation assemblies 200 to protect the drive mechanism 230, facilitating improvement of safety of the regulation assemblies 200.

In some embodiments, the coating die 10 includes the die body 100 and the plurality of regulation assemblies 200 spaced apart in the third direction $F_3$, where the accommodating cavity 1101 for accommodating the slurry is provided in the die body 100, the die body 100 is further provided with the coating gap 1102 communicating with the accommodating cavity 1101 and extending along the first direction $F_1$, and each regulation assembly 200 includes the flow regulation member 210, the transmission member 220, and the drive mechanism 230. The drive mechanism 230 is connected to an end of the flow regulation member 210 extending out of the die body 100 via the transmission member 220 so as to drive the flow regulation member 210 to move along the second direction $F_2$. The drive mechanisms 230 of the plurality of regulation assemblies 200 are all electrically connected to the controller 300.

The output of the drive mechanisms 230 of the plurality of regulation assemblies 200 can be controlled synchronously, making heights of the flow regulation members 210 of the plurality of regulation assemblies 200 in the second direction $F_2$ trend to be consistent. This can improve weight consistency of the coating applied by the coating die 10, thereby improving the product quality.

A coating apparatus provided in an embodiment of this application includes the foregoing coating die 10.

A battery production apparatus provided in an embodiment of this application includes the foregoing coating apparatus.

Technical features in the foregoing embodiments may be combined in any way. For brevity of description, not all possible combinations of the technical features in the foregoing embodiments are described. However, as long as there is no contradiction among combinations of these technical features, all the combinations should be considered within a scope recorded in this specification.

The foregoing embodiments represent only several implementations of this application, and descriptions thereof are specific and detailed, but should not be construed as any limitations on the scope of this patent. It should be noted that persons of ordinary skill in the art may further make several modifications and improvements without departing from the concept of this application, and all these modifications and improvements fall within the protection scope of this application. Therefore, the protection scope of this application should be subject to the appended claims.

What is claimed is:

1. A coating die, comprising:

a die body, wherein an accommodating cavity for accommodating a slurry is provided in the die body, and the die body is further provided with a coating gap communicating with the accommodating cavity and extending along a first direction; and a regulation assembly, wherein the regulation assembly comprises:

a flow regulation member running through the die body along a second direction and running into the coating gap, the flow regulation member being configured to move along the second direction relative to the die body; and a drive mechanism and a transmission member, wherein the drive mechanism is connected to an end of the flow regulation member extending out of the die body so as to drive the flow regulation member to move along the second direction, and wherein the drive mechanism is connected to the end of the flow regulation member extending out of the die body via the transmission member so as to drive, via the transmission member, the flow regulation member to move a preset distance along the second direction per unit time; and the drive mechanism being configured to regulate displacement of the flow regulation member in the second direction according to coating weight information of a slurry flowing out of the coating gap;

wherein the first direction and the second direction intersect with each other;

wherein the transmission member moves along the first direction under a driving force of the drive mechanism and drives the flow regulation member to move along the second direction; and wherein in a same time period, a displacement of the transmission member in the first direction is larger than a displacement of the flow regulation member in the second direction;

wherein the transmission member has a first inclined surface at an angle to both the first direction and the second direction, and the flow regulation member has a second inclined surface parallel to the first inclined surface; and the first inclined surface fits with the second inclined surface to convert linear motion of the transmission member in the first direction into linear motion of the flow regulation member in the second direction;

wherein the transmission member comprises a first portion connected to the drive mechanism and extending along the first direction and a second portion connected to a side of the first portion away from the drive mechanism; and the first inclined surface is provided on the second portion;

wherein the flow regulation member has a through groove for the second portion to run through, and the second inclined surface is provided on a side wall of the through groove.

2. The coating die according to claim 1, wherein:

the first inclined surface is one of two first inclined surfaces each provided at one of two opposite sides of the second portion in the second direction; and the second inclined surface is one of two second inclined surfaces provided at the side wall of the through groove of the flow regulation member, the second inclined surfaces being in one-to-one correspondence with the first inclined surfaces.

3. The coating die according to claim 1, further comprising:

a guide member;

wherein the first portion is slidably connected to the guide member in the first direction.

4. The coating die according to claim 3, wherein:

the guide member has a first sliding groove and a second sliding groove spaced apart in the first direction and communicating with each other;

the transmission member further comprises a third portion connected to a side of the second portion away from the first portion; and the first portion is slidably connected to the first sliding groove in the first direction, and the third portion is slidably connected to the second sliding groove in the first direction.

5. The coating die according to claim 4, wherein a rolling member is disposed on a side wall of at least one of the first sliding groove and the second sliding groove, the rolling member being configured to rotate under driving of the transmission member moving along the first direction.

6. The coating die according to claim 5, wherein:

the guide member comprises a first pressing plate assembly and a second pressing plate assembly that are disposed opposite each other and spaced apart in the first direction;

the first sliding groove is provided in the first pressing plate assembly, and the second sliding groove is provided in the second pressing plate assembly; and a sliding way extending along the second direction is defined between the first pressing plate assembly and the second pressing plate assembly, and the flow regulation member is slidably connected to the sliding way in the second direction.

7. The coating die according to claim 6, wherein:

the first pressing plate assembly comprises a first pressing plate and a first support plate that are disposed opposite each other and spaced apart in the second direction, and the first sliding groove is formed between the first pressing plate and the first support plate; a side wall of the first sliding groove comprises a first side wall provided on the first pressing plate, the first side wall being provided with a first groove recessed toward a side away from the first support plate in the second direction; and the first rolling member is disposed in the first groove; and/or the second pressing plate assembly comprises a second pressing plate and a second support plate that are disposed opposite each other and spaced apart in the second direction, and the second sliding groove is formed between the second pressing plate and the second support plate; a side wall of the second sliding groove comprises a second side wall provided on the second support plate, the second side wall being provided with a second groove recessed toward a side away from the second pressing plate in the second direction; and the first rolling member is disposed in the second groove.

8. The coating die according to claim 1, further comprising:

a gap regulation member, the gap regulation member movably running through the flow regulation member along the second direction, extending into the through groove, and abutting against the transmission member in the second direction.

9. The coating die according to claim 1, wherein a rolling member is disposed between the transmission member and the flow regulation member.

10. The coating die according to claim 1, further comprising:

a controller, the controller being electrically connected to the drive mechanism, and the controller being configured to obtain the coating weight information of the slurry flowing out of the coating gap and control output of the drive mechanism according to the coating weight information.

11. The coating die according to claim 10, wherein:

the regulation assembly is one of a plurality of regulation assemblies spaced apart in a third direction and the drive mechanism is one of a plurality of drive mechanisms, and the controller is electrically connected to the plurality of drive mechanisms of the plurality of regulation assemblies to synchronously control output of all the plurality of drive mechanisms; and the first direction, the second direction, and the third direction intersect with each other.

12. The coating die according to claim 11, wherein:

the flow regulation member comprises an extrusion body running through the die body along the second direction and a flow blocking member disposed at a bottom end of the extrusion body;

the coating gap has a first wall surface and a second wall surface disposed opposite each other in the second direction; and the flow blocking member has a limit position during movement of the flow regulation member in the second direction, and when the flow blocking member is in the limit position, a bottom end of the flow blocking member runs through the first wall surface along the second direction and abuts against the second wall surface of the coating gap to block the coating gap.

13. The coating die according to claim 12, wherein:

the flow blocking member is one of a plurality of flow blocking members;

the flow blocking member comprises a body portion disposed at the bottom end of the extrusion body and a protruding portion disposed on a side of the body portion in the third direction, the body portion and the protruding portion forming an engagement recess; and in two adjacent flow blocking members of the plurality of flow blocking members corresponding to two adjacent regulation assemblies of the plurality of regulation assemblies, the protruding portion of one flow blocking member of the plurality of flow blocking members is in fit connection with an engagement recess of another flow blocking member of the plurality of flow blocking members.

14. The coating die according to claim 1, wherein the drive mechanism comprises a servo driver.

15. The coating die according to claim 1, wherein:

the die body comprises a first die head and a second die head disposed opposite each other in the second direction, and the coating gap is formed between the first die head and the second die head; and the accommodating cavity is provided in the second die head, and the flow regulation member runs through the first die head along the second direction and is capable of running into the coating gap.

* * * * *